(12) United States Patent
Lyngbäck (10) Patent No.: US 11,198,598 B2
(45) Date of Patent: Dec. 14, 2021

(54) VEHICLE PROVIDED WITH A CONTROL SYSTEM, AND A METHOD RELATED TO THE VEHICLE

(71) Applicant: Hiab AB, Kista (SE)

(72) Inventor: Hans Lyngbäck, Hudiksvall (SE)

(73) Assignee: Hiab AB, Kista (SE)

( * ) Notice: Subject to any disclaimer, the term of this patent is extended or adjusted under 35 U.S.C. 154(b) by 117 days.

(21) Appl. No.: 16/722,157

(22) Filed: Dec. 20, 2019

(65) Prior Publication Data

US 2020/0198940 A1    Jun. 25, 2020

(30) Foreign Application Priority Data

Dec. 21, 2018  (EP) ................................... 18215262

(51) Int. Cl.
*B66C 13/48*  (2006.01)
*B60W 10/30*  (2006.01)
*B60W 50/00*  (2006.01)

(52) U.S. Cl.
CPC .............. *B66C 13/48* (2013.01); *B60W 10/30* (2013.01); *B60W 2050/0043* (2013.01); *B60W 2300/16* (2013.01)

(58) Field of Classification Search
CPC ....... B66C 13/48; B66C 13/16; B66C 15/045; B60W 10/30; B60W 2050/0043;
(Continued)

(56) References Cited

U.S. PATENT DOCUMENTS 8,498,806 B2    7/2013  Fukano et al.
9,415,953 B2    8/2016  Bonefas
(Continued)

FOREIGN PATENT DOCUMENTS

| EP | 3 134 633 A1 | 3/2017 |
| EP | 3 315 671 | 5/2018 |
| WO | 2015/162332 A1 | 10/2015 |

OTHER PUBLICATIONS

Extended European Search Report for corresponding European Patent Application No. 18215262.9 dated Jul. 8, 2019.

*Primary Examiner* — Marthe Y Marc-Coleman
(74) *Attorney, Agent, or Firm* — Renner, Otto, Boisseile & Sklar, LLP (57) ABSTRACT

A vehicle (2) comprising at least one working unit (4) and a vehicle control system (6) comprising control units for controlling the vehicle to work in accordance with one or many working procedures. The vehicle is provided with a plurality of sensor units (12) configured to generate a sensor signal (14). Each control unit (8) is configured to determine control signals (18) to control its working unit (4), and the control unit designated to the vehicle is configured to determine control signals to control the vehicle, and also to determine control signals (18) for controlling at least one of the other working units (4) or the vehicle, and specifically to determine control signals (18) capable of controlling steps of a working procedure. At each point in time one of the control units is a master control unit being the control unit that is responsible for controlling its own working unit (4) and also at least one other working unit (4), and that at least two control units (8) are configured to be a master control unit. A determination procedure is provided to continuously determine if handover to another control unit, then being the new master control unit, should be made, and enabling the new master control unit to take control in accordance with the current working procedure if handover has been determined.

14 Claims, 3 Drawing Sheets

(58) Field of Classification Search
CPC ... B60W 2300/16; E02F 9/268; E02F 9/2045; E02F 9/205; E02F 9/262; H04L 12/40202
See application file for complete search history.

(56) References Cited

U.S. PATENT DOCUMENTS

| | | |
|---|---|---|
| 9,992,931 B2 | 6/2018 | Bonefas et al. |
| 2011/0119556 A1 | 5/2011 | de Buen |
| 2015/0308070 A1* | 10/2015 | Deines .................. E02F 9/24 701/50 |
| 2018/0046161 A1 | 2/2018 | Yhr |

* cited by examiner

VEHICLE PROVIDED WITH A CONTROL SYSTEM, AND A METHOD RELATED TO THE VEHICLE

This application claims priority to European Patent Application No. 18215262.9 filed on Dec. 21, 2018, which is hereby incorporated herein by reference.

TECHNICAL FIELD

The present disclosure relates to a vehicle including a control system, and relates specifically to optimize control of a vehicle provided with a working unit, e.g. a loader crane, and a method in relation thereto.

BACKGROUND

A vehicle may be equipped with different working units, such as a loader crane or a hook-lift (also called a demountable), to perform certain working procedures. With a hook-lift mounted on a vehicle, such as a truck, the vehicle may load and unload objects like flatbeds, dumpster bodies, and similar containers. Various applications within waste-handling, recycling, scrap and demolition industries are then available.

Another example of a vehicle equipped with a working unit is a truck with a crane e.g. a loader crane. The crane may then be used to load and unload objects that is or is to be transported on the truck. The crane may alternatively or in addition to that also be used for performing various working procedures when the vehicle is parked, such as moving objects.

As the working units are mounted on a movable vehicle the position and direction of the working unit relative the object of the working procedure is depending on the position and direction of the vehicle. In order to achieve a viable, or optimal workflow, for the working units the vehicle position relative to the object (and also the surrounding) often needs to be adjusted.

Today this is managed by the driver of the vehicle, and it is the experience and knowledge of the driver that determines the success and safety of the work that is performed by the vehicle and working unit. Other factors such as the time spent on a working task and the wear and tear of the working unit is also affected by the driver's choices during a working assignment.

General aspects of the above technical field is discussed in the following documents.

U.S. Pat. No. 9,415,953 discloses a method for transferring agricultural material from one vehicle (e.g., harvesting machine) to another vehicle (e.g., grain cart or wagon) by means of a spout arranged on the combine. The method helps with aligning the spout correctly with the grain cart by generating commands to a propulsion or steering controller. It is disclosed a spout controller connected to steering and propulsion control units via a data bus.

EP3315671 discloses a work assist system for a work machine. The system comprises a work position calculator section implemented in a controller. Data from various sensors about the environment surrounding the vehicle is inputted into the work position calculator and a result representing a correct working position for the vehicle is presented to the driver. It is suggested that the vehicle may automatically move itself to the working position.

U.S. Pat. No. 8,498,806 shows positional guiding system for an excavator. The system comprises means for calculating an optimal work position and displaying that information to the operator.

Although some improvements have been suggested in the above prior art there still remain drawbacks of the presently applied technique, regarding safety and that manual interference of working procedures often are required. The object of the present invention is to achieve a vehicle that removes, or at least mitigates, these drawbacks, such that a viable, secure and optimal workflow is achieved during working procedures performed by the vehicle, in particular when positioning the vehicle relative an object.

SUMMARY

The above-mentioned objects are achieved, or at least mitigated, by the present invention according to the independent claims.

Preferred embodiments are set forth in the dependent claims.

The claimed invention is based upon a system approach to the vehicle and working unit(s). The control units of the vehicle and the working unit(s) are connected to each other using a machine to machine (M2M) connection, such as CAN. Measurements from sensor units detecting moving and non-moving objects in the environment of the vehicle are important for system. Examples of such sensors are LIDAR, 3D cameras, cameras, Lasers, thermal cameras and radars. The sensors may be mounted to the vehicle and/or the working unit, but the sensors may also be mounted on other vehicles, or stationary sensors or sensors on other types of vehicles, and connected to the control units through e.g. various wireless communication protocols.

One of the control units is assigned to be the master and the other one(s) are slave units controlled by the master unit. A set of determination rules are used to continuously determine which of the control units that should be designated as the master control unit. The determination is based on verifying various measured parameter values from the sensors, and also by applying a status value of an ongoing working procedure. This status value indicates the progress of the working procedure.

A working procedure is a sequence of steps performed to execute a working task such as collecting timber, delivering goods to a construction site or emptying waste in recycling containers. Each of these working tasks is defined by a working procedure with a sequence of steps that may be predetermined. The sequence of steps may of course also adapt according to what happens during a working procedure and is hence also depending on measurements from sensors and feedback from previous steps. The status value may be a value indicating the current state, or step, of the working procedure.

In one implementation of the vehicle according to the present invention as a fully automatic operation of the working unit and vehicle is achieved, there is also a safety issue involved and the vehicle and working unit needs to be able to detect that there is no obstacle in the environment that it may collide with.

As an alternative, the operator may initiate the operation of moving the working unit if he/she finds it possible. The operator can then abort the operation if there is any danger of colliding with any object. Feedback from sensors detecting moving and non-moving objects in the environment of the vehicle are important for both these alternatives, as input to the fully automated system or for providing alerts to the operator.

The present invention is advantageous in that the control of a current working procedure is performed by the control unit that is most optimal for the working procedure being executed. This "case dependent control" is accomplish by allowing the responsible master control unit to change between all the involved control units in order to achieve an optimal and smooth control where less manual steps are required and where also safety is increased.

Thus, a semi or fully autonomous working procedure is achieved when applying the vehicle and method according to the present invention where movements of the vehicle is synchronized with movements of a loader crane during a working procedure resulting in an optimal positioning of the vehicle in relation to the load with no manual interference required.

DETAILED DESCRIPTION

The vehicle and method will now be described in detail with references to the appended figures. Throughout the figures the same, or similar, items have the same reference signs. Moreover, the items and the figures are not necessarily to scale, emphasis instead being placed upon illustrating the principles of the invention.

Figure 1:
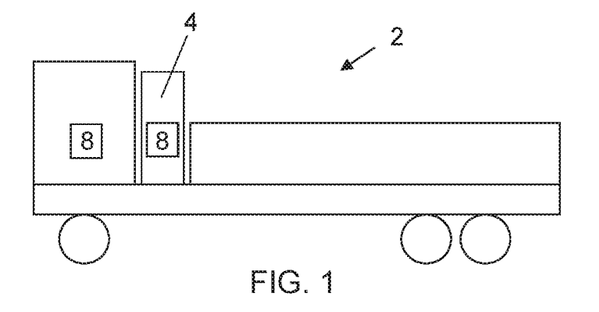
FIG. 1 is a schematic illustration of a vehicle according to the present invention.

FIG. 1 schematically illustrates a vehicle 2 comprising at least one working unit 4 and a vehicle control system for controlling the vehicle to work in accordance with one or many working procedures, e.g. a loading procedure, of a working order.

The vehicle is preferably a working vehicle, e.g. a cargo vehicle or a forestry vehicle, such as a truck with a loader crane mounted to it or any other vehicle that is connected to and carries a working unit. The working unit is e.g. a crane, loader crane, hook-lift or other type of equipment for loading or unloading objects to be transported.

A working procedure includes a number of working steps to be performed in order to fulfil a working task included in a working order which is made available to the vehicle control system e.g. by a wireless communication. The working procedure may be a loading and/or unloading procedure, a lifting procedure, etc.

In the case of a loading procedure, the procedure may for example comprise working steps like finding the object to be loaded, position the vehicle in a loading position with reference to the found object to be loaded, moving the object to be loaded from the ground to the vehicle etc. A working task connected to the loading procedure may be defined at a higher abstract level such as emptying recycling bins at location X. The working task may further be part of a working order on a more general level, such as managing recycling stations within area Y.

The vehicle control system 6 (see FIG. 2) comprises at least two control units 8. Each working unit 4 has a designated control unit 8, and at least one control unit is designated to the vehicle.

Figure 2:
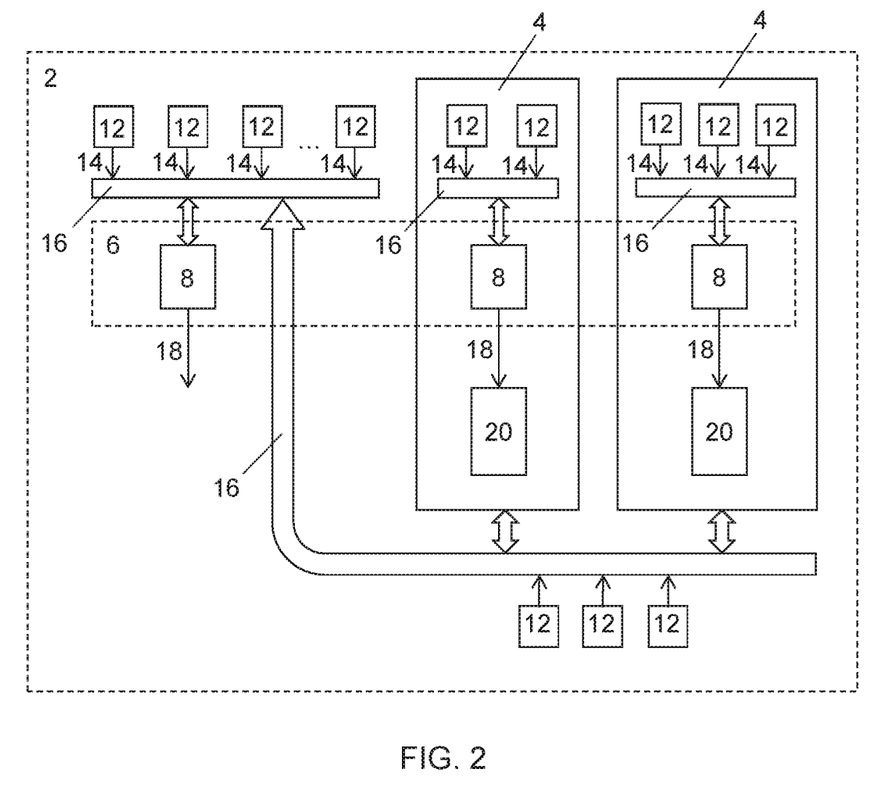
FIG. 2 is a block diagram schematically illustration the present invention.

Furthermore, the vehicle 2 comprises a plurality of sensor units 12 arranged to detect and measure a plurality of different measurement parameters in relation to the vehicle, its environment, and the working unit(s). Each sensor unit 12 is configured to generate a sensor signal 14 in dependence of a measured parameter and to apply the sensor signal to a control unit 8.

The sensor unit 12 may be a camera, a positioning sensor, e.g., a GPS sensor, a LIDAR, 3D cameras, cameras, laser units, a thermal camera, a radar, etc. The sensor units may be used for various applications and may in addition to a sensor component comprise additional hardware and software for analyzing measurements performed or samples gathered by the sensor component. The sensor signal 14, may hence comprise measurement values, and results of analysis of measurement values on various complexity levels. A 3D camera may for example generate a sensor signal corresponding to an object identified as an object to be loaded and the coordinates of this object, whereas a laser unit may generate a sensor signal corresponding to a distance to an object in a predetermined direction. As a further example the sensor unit 12 may be a sensor for reading information coded in RFID tags, bar codes, QR-codes or other similar codes or tags. An object to be loaded may e.g. be marked with such a tag describing the ID of the object, the weight of the object etc.

Each control unit is provided with a communication interface and is connected to a common data bus 16, e.g. a CAN bus, and is configured to perform bidirectional communication, e.g. comprising sensor signals, to all other control units such that all control units of the vehicle have access to the same current measured parameters via said communication interfaces. Further protocols based on CAN may be applied, like application layer protocols such as SAE J1939 for in-vehicle networks for buses and trucks may further be used for the communication. As an alternative various protocols based on Ethernet and similar standards may be used such as Broad R Reach. Within a system with working units mounted on a vehicle various communication protocols may be used in different parts of the system.

Each control unit 8 is configured to determine control signals 18 to control its working unit 4 via working unit control members 20, and the control unit designated to the vehicle is configured to determine control signals to control the vehicle.

The control units are also configured to determine control signals 18 for controlling at least one of the other working units 4 or the vehicle 2, and specifically to determine control signals 18 capable of controlling steps of a working procedure. The control signals 18 configured to control another working unit or the vehicle are distributed via the common data bus 16. FIG. 2 shows a schematic block diagram illustrating a vehicle 2 comprising two working units 4. A number of sensor units are connected to the various control units 4 via the common data bus 16. The control unit 4 to the left in the figure is designated to the vehicle, and the control signals 18 generated by this control unit are applied to various devices and means required to operate the vehicle.

Each of the control units disclosed herein comprises the necessary processing capacity to perform its intended task and comprises necessary data storage capabilities, and communication capabilities to support the task. The control units may comprise distributed processing entities.

The control unit of a working unit being a crane may e.g. control the movements of the crane system's booms like velocities of movements of booms, or the initiation or halt of automatic procedures such as automatic parking or control of the crane tip in specific way. The control unit of the vehicle may e.g. control the steering angle of the vehicle, movements in reverse or drive, the velocity, various indicators, bogie up/down, air suspension etc.

At each point in time one of the control units is a master control unit being the control unit that is responsible for controlling the vehicle 4 and at least one working unit 8. There are at least two of the control units 8 that are configured to be able to act as a master control unit.

A determination procedure is provided to determine, preferably continuously, if handover to another control unit should be made, which then will be the new master control unit, and also enabling the new master control unit to take control of the working procedure if handover has been determined.

According to one embodiment the determination procedure comprises applying a set of determination rules including:

verifying that measured parameter values fulfil predefined requirements for performing handover, determining a status value of an ongoing working procedure indicating the progress of the working procedure and determining if the status value requires handover.

Verifying that measured parameter values fulfil predetermined requirements may include to compare measured parameter values to predetermined thresholds which are defined in relation to the working procedure. It may further relate to compare information obtained by a sensor unit being a camera regarding the number of bins to be collected with the number of bins stated in a working order to be collected.

Alternatively or in addition to what has previously been described the verifying may relate to a determined position of an object such as object(s) to be loaded, or a determined position for unloading object(s). The determined position may be a relative position to e.g. the working unit, or a part of the working unit. The determined position may of course also be a global position such as a GPS coordinate.

According to another embodiment the status value consecutively reflects the progress from start to end of a working procedure, and that each consecutive status value from start to end of a working procedure has a recommended master control unit. In one variation a look-up table is provided listing the steps of the working procedure and the corresponding recommended master control unit.

According to a further embodiment one determination rule comprises verifying that the measured parameter value being the velocity of the vehicle fulfils predefined requirements for performing handover. In one example the velocity of the vehicle must not be higher than a predetermined velocity threshold in order to acknowledge handover to the control unit of a loader crane.

In another determination rule it may be stated that the control unit of the vehicle is the master control unit if the velocity of the vehicle is above predefined threshold. It could further be set as a requirement that the vehicle needs to be in a full stop, before there is a shift of role as the master control unit.

Preferably, the sensor units comprise at least one sensor unit which is configured to detect any unwanted activity within a loading area. Detection of objects, such as unknown objects, moving objects, humans etc. may indicate unwanted activity. It should be noted that a loading area is regarded as an area where the working procedure, or parts of the working procedure, takes place. It should not be limited to loading procedures, as it could just as well be the place for an unloading procedure or another working procedure. In that regard a determination rule comprises verifying whether it is safe to continue the ongoing working procedure, and if not, the ongoing working procedure is halted.

In one further embodiment one of the working units is a loader crane mounted at the vehicle, and one determination rule comprises determining if the vehicle approaches a loading area, and if it is determined that the vehicle approaches the loading area the control unit of the loader crane is designated to be the master control unit. The approaching of the vehicle to the loading area may e.g. be measured by a GPS sensor in combination with a camera, and a sensor unit measuring the distance to the loading area.

According to another but related embodiment, the control unit of a working unit, being a loader crane mounted at the vehicle, is designated to be the master control unit. The master control unit is then configured to generate control signals adapted to control movement of the vehicle as a preparation to or in combination with movements of the loader crane.

Preferably, at least one of the control units is also configured to receive sensor signals including measurement parameters from external sensor units arranged remote from the vehicle. The external sensor units may comprise a camera, a LIDAR, 3D cameras, laser units, a thermal camera, a radar that is further arranged to communicate with the control units of the vehicle, e.g. through wireless communication protocols.

Other examples of external sensors may include surveillance cameras monitoring the area for loading. Such external sensors covering the area from other angles than the vehicle may be used for detecting obstacles or persons in positions not covered by the sensor units on the vehicle or working unit.

In another example, if, during an ongoing procedure some sensor values are outside predefined thresholds, e.g. if a load is too heavy, the working procedure includes procedural steps to handle that situation, which may e.g. be to move the vehicle to a position where the heavier load may be handled, i.e. move the vehicle closer to the load.

It may also be possible to receive information from other vehicles where the information may relate to certain obstacles at or changes of a loading area. Advanced waste management sites may be provided with numerous external sensor units that may be used to assist the vehicles during loading and/or unloading. This is one example where external sensor units may be included among the sensor units that will provide sensor signals to the control units of the vehicle.

If there are many separate compartments in a bin where each compartment is dedicated for a specific type of garbage, or fraction (glass, paper, plastic, etc.), it is necessary to include that information in the dedicated working procedure. When the loading is about to take place the sensor unit, e.g. a camera, will identify the number of compartments and compare to the number according to the working procedure in the working order. If these numbers correspond to each other the procedure will continue, if not manual intervention may be required, i.e. the control unit will generate an indication signal.

A typical working procedure for a loading type of task, such as emptying recycling bins, may comprise a step of transport to a predefined position defined by e.g. GPS coordinates during which the control unit of the vehicle is the master control unit. Upon arrival at the site of the predefined position, another step of the working procedure may be triggered to prepare the vehicle for loading material for recycling from the bins. Handover of the role as master control unit to a loader crane mounted to the vehicle is then performed in response to verifying various measured parameters. The measured parameters may e.g. indicate that the vehicle is close to a position acceptable for performing lifting steps/emptying steps with the loader crane. When the vehicle is in the surrounding of the position of the bins it is advantageous to let the control system of the loader crane to control the vehicle. This as it is this working unit that is specialized in the lifting steps of the working procedure, it may hence control the driving of the vehicle so that it ends up in a position relative to the bins which is at least viable, if not optimal, for lifting the bins with the loader crane. Further, decisions regarding which of the possible lifting positions that is a first choice can be taken and the lifting process may further be adapted to the lifting position.

For emptying waste in recycling containers; examples of steps of a working procedure may be: locating the recycling container to empty, positioning the vehicle in a position close to the location of the container, connecting the loader crane to the recycling container, lifting and positioning the recycling container over a transport container on the truck, emptying the waste of the recycling container etc.

During e.g. loading or unloading the control unit of the working unit, e.g. being a loader crane, may control the vehicle and adjust the position of the vehicle. When the control unit of the vehicle reports that the wanted position has been reached the working unit can perform the load operation.

A working procedure may include, as a final step, instructions to control the working unit, e.g. the loader crane, to return to an initial parked position.

According to one further example the operator may initiate, or intervene, a working procedure, e.g. to apply certain movements to the loader crane if he/she finds it necessary. The operator may also abort the operation if there is any danger of colliding with any object.

In a further example a detected signal value from a sensor unit may result in that a current working step is halted and handover to another master control unit is performed. This may occur e.g. in a situation where the control unit of a loader crane is the master control unit that controls the vehicle to prepare/adjust the position of the vehicle for loading/unloading. During this step one of the sensor units mounted to the vehicle detects a human close to the vehicle and distributes a sensor signal in accordance with this. This sensor signal will result, for safety reasons, in that the current working step is halted and the role of the master control unit is handed over to the vehicle. After verifying the safety at the loading area, the role as master may be handed over to the control unit of the loader crane again and the working step of positioning the vehicle may be continued.

The vehicle control system is capable of communicating with a supervising control centre and receiving a working order or an individual task from the control centre. A working order includes one or many working tasks with corresponding working procedures. The control centre is capable of providing and sending out working orders or individual tasks to a plurality of vehicles.

The present invention also relates to a method in relation to a vehicle, the vehicle comprises at least one working unit and a vehicle control system for controlling the vehicle to work in accordance with one or many working procedures. The vehicle is described in detail above and it is herein referred to that description.

Figure 3:
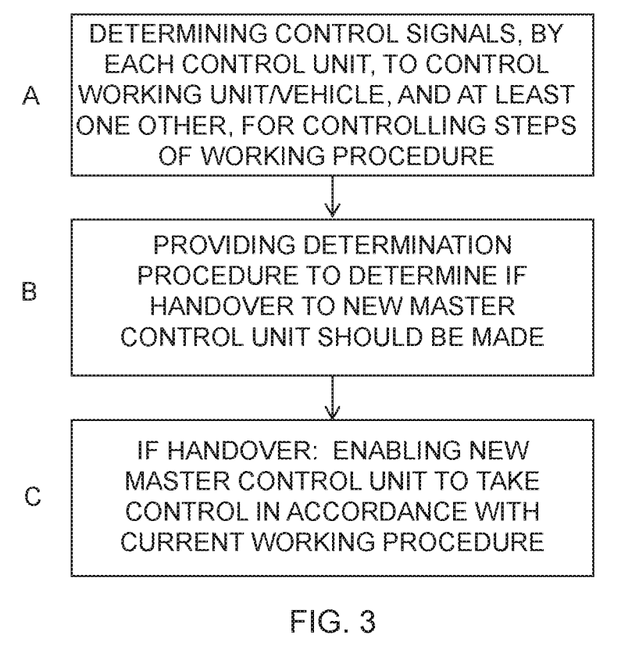
FIG. 3 is a flow diagram illustrating a method according to the present invention.

With reference to the flow diagram shown in FIG. 3 the method will now be discussed.

The method comprises:

A—determining control signals, by each control unit, to control its working unit, and by the control unit designated to the vehicle, and also to control at least one of the other working units or the vehicle, and specifically determining control signals capable of controlling steps of a working procedure, wherein at each point in time one of the control units is a master control unit being the control unit that is responsible for controlling the vehicle and at least one working unit;

B—providing a determination procedure to determine, preferably continuously, if handover to another control unit, then being the new master control unit, should be made; and C—enabling the new master control unit to take control in accordance with the current working procedure if handover has been determined.

Figure 4:
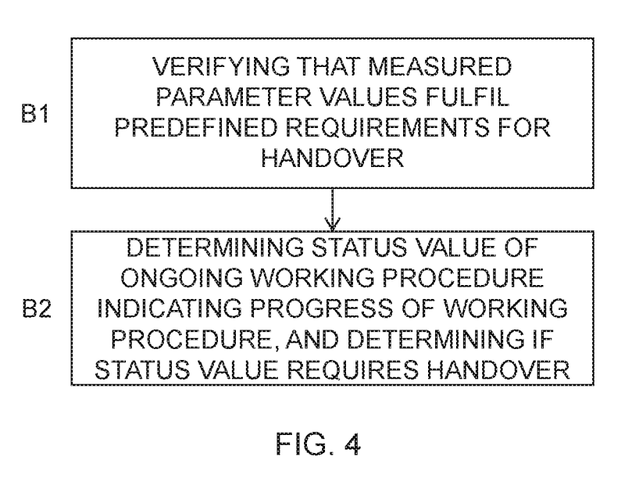
FIG. 4 is a flow diagram illustrating a method according to an embodiment of the present invention.

According to one embodiment the method comprises the further steps which will be discussed with reference to the flow diagram shown in FIG. 4.

Thus, the determination procedure comprises applying a set of determination rules including:

B1—verifying that measured parameter values fulfil predefined requirements for performing handover, B2—determining a status value of an ongoing working procedure indicating the progress of the working procedure and determining if the status value requires handover.

Preferably, the status value consecutively reflects the progress from start to end of a working procedure, and wherein each consecutive status value from start to end of a working procedure has a recommended master control unit.

In a further embodiment of the method it comprises that one determination rule comprises verifying that the measured parameter value being the velocity of the vehicle fulfils predefined requirements for performing handover.

According to another embodiment one of the working units is a loader crane mounted at the vehicle, and wherein one determination rule comprises determining if the vehicle approaches a loading area, and if it is determined that the vehicle approaches the loading area the control unit of the loader crane is designated to be the master control unit.

In another embodiment of the method a working unit is designated to be the master control unit. The method then comprises generating control signals, by the master control unit, being adapted to control movement of the vehicle in combination with movements of the working unit.

Preferably the method also comprises receiving, by at least one of the control units, sensor signals including measurement parameters from external sensor units arranged remote from said vehicle.

Figure 5:
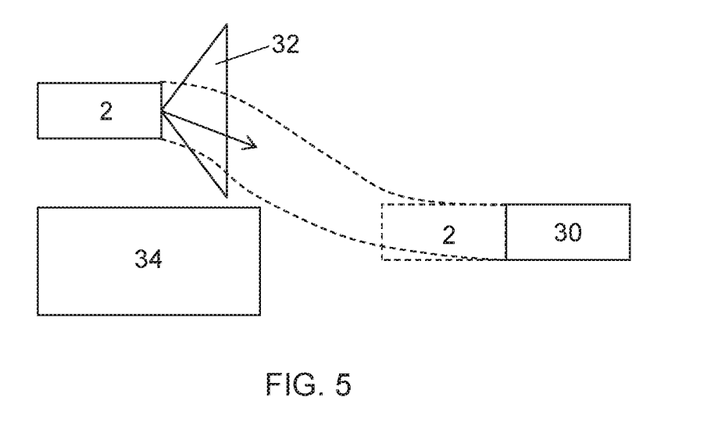
FIG. 5 shows a schematic illustration of one scenario of implementing the present invention.
Figure 6:
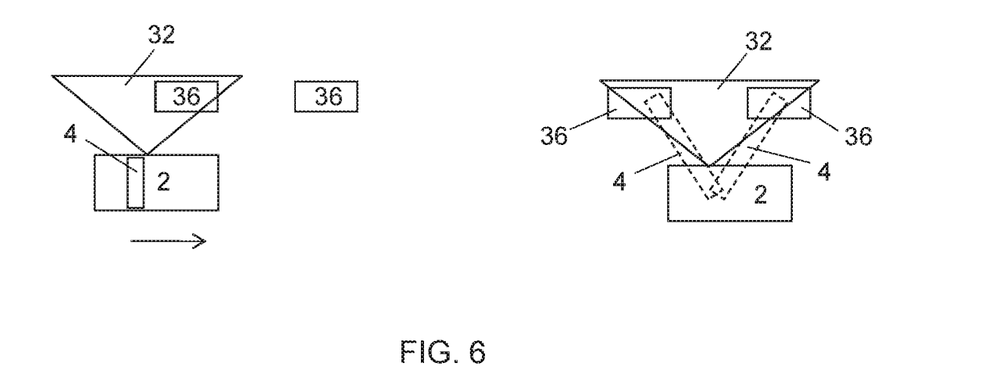
FIG. 6 shows a schematic illustration of another scenario of implementing the present invention.

In FIGS. 5 and 6 two different scenarios are illustrated of a vehicle applying the present invention.

In FIG. 5 the vehicle 2 is provided with a working unit being a hook-lift. The working task is to load a container 30 onto the vehicle. The applicable working procedure starts when the vehicle is in the illustrated position to the left. The end of the working procedure is when the container is successfully loaded. A sensor unit arranged at the hook-lift scans backwards which is illustrated by the scanning area 32. When the velocity of the vehicle is sufficiently low, and/or when the vehicle has reached a predetermined position, and/or when sensor data from various sensor units indicate that handover should be done, the control of the working procedure is handed over to the control unit of the hook-lift that will become the master control unit. By continuously analyzing the position of the vehicle in relation to the container, and also images from a camera arranged at the hook lift, control signals are provided to the control unit of the vehicle that will control movement of the vehicle to slowly move the vehicle along an optimal path (illustrated by dashed lines) to a correct position in order to load the container onto the vehicle, and avoiding an obstacle 34 along the path. The final position of the vehicle during the working procedure is illustrated by a dashed rectangle.

In the scenario illustrated in FIG. 6 the vehicle 2 is provided with a working unit 4 being a loader crane. The working task is to load two loads 36 onto the vehicle. When the vehicle arrives at the position in the illustrated position to the left in FIG. 6, the control unit of the vehicle is the master control unit. Sensors at the vehicle and/or loader crane determines that the vehicle is close to the loads in this position and a new step of the working procedure is thereby triggered. During this preparation step the loader crane is the master control unit, and controls the vehicle to move in the direction of the illustrated arrow in FIG. 6. The control unit of the loader crane may use input from sensors mounted to the vehicle as well as the loader's crane in this step of the working procedure. When the vehicle is in an optimal position in relation to both loads loading may start. The optimal position is determined such that no movement of the vehicle is required during loading of the loads taken e.g. the weight of the loads and the maximum outreach of the loader crane into account. In the illustration to the right in the figure the vehicle is in that optimal position and the control unit of the loader crane is the master control unit which then controls the loading of the loads. The end of the working procedure is when the loads are successfully loaded. The scanning area 32 of the loader crane is illustrated.

The present invention is not limited to the above-described preferred embodiments. Various alternatives, modifications and equivalents may be used. Therefore, the above embodiments should not be taken as limiting the scope of the invention, which is defined by the appending claims.

The invention claimed is:

1. A vehicle comprising at least one working unit, being equipment for unloading or loading objects to be transported, and a vehicle control system for controlling the vehicle to work in accordance with one or many working procedures,
the vehicle control system comprising at least two control units, one control unit designated to each of the at least one working units, and one control unit designated to the vehicle,
the vehicle comprising a plurality of sensor units arranged to detect and measure a plurality of different measurement parameters in relation to the vehicle, its environment, and the working unit, wherein each sensor unit is configured to generate a sensor signal in dependence of a measured parameter and to apply said sensor signal to a control unit, and that each control unit is provided with a communication interface configured to perform bidirectional communication to all other control units such that all control units of the vehicle have access to the same current measured parameters via said communication interfaces,
wherein each control unit is configured to determine control signals to control its working unit, and the control unit designated to the vehicle is configured to determine control signals to control the vehicle, and each of the control units is also configured to determine control signals for controlling at least one of the other working units or the vehicle, and specifically to determine control signals capable of controlling steps of a working procedure,
wherein at each point in time one of the control units is a master control unit controlling the other control unit(s) acting as slave unit(s) and that at least two control units are configured to be a master control unit,
wherein the vehicle control system is configured to provide a determination procedure to determine if handover to another control unit, then being a new master control unit, should be made, and enabling the new master control unit to take control in accordance with the current working procedure if handover has been determined.

2. The vehicle according to claim 1, wherein the determination procedure comprises applying a set of determination rules including:
verifying that measured parameter values fulfil predefined requirements for performing handover,
determining a status value of an ongoing working procedure indicating the progress of the working procedure and determining if the status value requires handover.

3. The vehicle according to claim 2, wherein said status value consecutively reflects the progress from start to end of a working procedure, and wherein each consecutive status value from start to end of a working procedure has a recommended master control unit.

4. The vehicle according to claim 2, wherein one determination rule comprises verifying that the measured parameter value being the velocity of the vehicle fulfils predefined requirements for performing handover.

5. The vehicle according to claim 2, wherein one of the working units is a loader crane or a hook-lift mounted at the vehicle, and wherein one determination rule comprises determining if the vehicle approaches a loading area, and if it is determined that the vehicle approaches the loading area the control unit of the loader crane, or the hook-lift, is designated to be the master control unit.

6. The vehicle according to claim 1, wherein if the control unit of a working unit is designated to be the master control unit, the master control unit is then configured to generate control signals adapted to control movement of the vehicle in combination with movements of the working unit.

7. The vehicle according to claim 1, wherein at least one of said control units is also configured to receive sensor signals including measurement parameters from external sensor units arranged remote from said vehicle.

8. A method for controlling a vehicle, the vehicle including at least one working unit, being equipment for unloading or loading objects to be transported, and a vehicle control system for controlling the vehicle to work in accordance with one or many working procedures, the vehicle control system including at least two control units, one control unit designated to each of the at least one working units, and one control unit is designated to the vehicle, the vehicle further including a plurality of sensor units arranged to detect and measure a plurality of different measurement parameters in relation to the vehicle, its environment, and the working unit, wherein each sensor unit is configured to generate a sensor signal in dependence of a measured parameter and to apply said sensor signal to a control unit, and that each control unit is provided with a communication interface configured to perform bidirectional communication to all other control units such that all control units of the vehicle have access to the same current measured parameters via said communication interfaces,
wherein the method comprises:
A—determining control signals, by each control unit, to control its working unit, and by the control unit designated to the vehicle, and also to control at least one of the other working units or the vehicle, and specifically determining control signals capable of controlling steps of a working procedure, wherein at each point in time one of the control units is a master control unit controlling the other control unit(s) acting as slave unit(s);

B—providing a determination procedure to determine if handover to another control unit, then being a new master control unit, should be made; and C—enabling the new master control unit to take control in accordance with the current working procedure if handover has been determined.

9. The method according to claim 8, wherein the determination procedure comprises applying a set of determination rules including:

B1—verifying that measured parameter values fulfil predefined requirements for performing handover, B2—determining a status value of an ongoing working procedure indicating the progress of the working procedure and determining if the status value requires handover.

10. The method according to claim 9, wherein said status value consecutively reflects the progress from start to end of a working procedure, and wherein each consecutive status value from start to end of a working procedure has a recommended master control unit.

11. The method according to claim 9, wherein one determination rule comprises verifying that the measured parameter value being the velocity of the vehicle fulfils predefined requirements for performing handover.

12. The method according to claim 9, wherein one of the working units is a loader crane, or a hook-lift, mounted at the vehicle, and wherein one determination rule comprises determining if the vehicle approaches a loading area, and if it is determined that the vehicle approaches the loading area the control unit of the loader crane, or the hook-lift, is designated to be the master control unit.

13. The method according to claim 8, wherein if the control unit of a working unit is designated to be the master control unit, the method comprises generating control signals, by the master control unit, being adapted to control movement of the vehicle in combination with movements of the working unit.

14. The method according to claim 8, comprising receiving, by at least one of said control units, sensor signals including measurement parameters from external sensor units arranged remote from said vehicle.

* * * * *